US012325258B2

(12) United States Patent
Qiu et al.

(10) Patent No.: US 12,325,258 B2
(45) Date of Patent: Jun. 10, 2025

(54) ELECTRIC PENCIL SHARPENER WITH DELAY FUNCTION

(71) Applicants: Dongguan In-mind Technology Co., Ltd., Guangdong (CN); Shenzhen Abel Technology Co., Ltd., Guangdong (CN)

(72) Inventors: Weidong Qiu, Guangdong (CN); Kai Xu, Guangdong (CN); Hua Chen, Guangdong (CN)

(73) Assignee: DONGGUAN IN-MIND TECHNOLOGY CO., LTD., Dongguan (CN)

( * ) Notice: Subject to any disclaimer, the term of this patent is extended or adjusted under 35 U.S.C. 154(b) by 248 days.

(21) Appl. No.: 18/058,874

(22) Filed: Nov. 27, 2022

(65) Prior Publication Data

US 2023/0256771 A1 Aug. 17, 2023

(30) Foreign Application Priority Data

Feb. 14, 2022 (CN) ......................... 202220295192.3

(51) Int. Cl.
*B43L 23/02* (2006.01)
*B43L 9/00* (2006.01)
*B43L 23/00* (2006.01)

(52) U.S. Cl.
CPC ............. *B43L 23/02* (2013.01); *B43L 23/008* (2013.01)

(58) Field of Classification Search
CPC ...... B43L 23/00; B43L 23/004; B43L 23/008; B43L 23/02; B43L 23/04; B43L 23/08
(Continued)

(56) References Cited

U.S. PATENT DOCUMENTS 8,353,323 B2 * 1/2013 Schumacher ........... B43L 23/00 144/28.72
2015/0129086 A1 * 5/2015 Schumacher ......... B43L 23/008 475/331

FOREIGN PATENT DOCUMENTS

CN 106313988 A * 1/2017
CN 213228132 U 5/2021
(Continued)

OTHER PUBLICATIONS

Yin Jie; Chen, Xiao-Ping; Ye, Yu-Jia; Liu, Xue-Xi; Delay Breaking Device For Electric Pencil Sharpener And Electric Pencil Sharpener, Jul. 2, 2021 (Year: 2021).*
(Continued)

*Primary Examiner* — Christopher L Templeton
*Assistant Examiner* — Adam Anthony Centanni
(74) *Attorney, Agent, or Firm* — SHIMOKAJI IP

(57) ABSTRACT

An electric pencil sharpener with delay function includes a motor, a drive assembly, a gear assembly and a cutter assembly. The drive assembly includes a connecting rod, a drive shaft and a start trigger, a stop trigger, and a thrust plate. The connecting rod is moved backward to drive the start trigger to trigger the motor, and synchronously rotated with the cutter assembly; the stop trigger is provided with a teeth structure and a friction structure respectively. The thrust plate is rotated or moved to push against the drive shaft, so that the connecting rod continues to move backwards until the bulge portion engages with the teeth structure, and the ring portion matches with the friction structure, thereby actuating the stop trigger to move to trigger an action of the stop switch of the motor.

10 Claims, 6 Drawing Sheets

(58) Field of Classification Search
USPC .......................................................... 144/28.5
See application file for complete search history.

(56) References Cited

FOREIGN PATENT DOCUMENTS

| | | | | |
|---|---|---|---|---|
| CN | 213413376 U | | 6/2021 |
| CN | 213593999 U | * | 7/2021 |
| CN | 213594000 U | | 7/2021 |

OTHER PUBLICATIONS

Zheng, Chong-Ting; Electric Pencil Sharpener, Jan. 11, 2017 (Year: 2017).*

* cited by examiner

ELECTRIC PENCIL SHARPENER WITH DELAY FUNCTION

FIELD OF THE INVENTION

The application relates to the field of stationery products, in particular to an electric pencil sharpener with delay function.

BACKGROUND OF THE INVENTION

Electric pencil sharpeners are electric stationery products in which a motor drives a hob to make planetary motions to sharpen the pencil. In use, one end of the pencil is inserted into the cutting channel, and the motor is started to drive the hob to make a planetary cutting movement around the pencil thereby sharpening the pencil tip. The pencil is pulled out after sharpening. However, the motor in the current pencil sharpener is immediately stopped after sharpening, causing the hob stop suddenly, which brings several problems. For example, cutting dents may be formed on the pencil tip, the cutting surface is rough, and parts of pencil shavings are remained on the cutting surface, which results in a poor cutting effect. For this reason, a manual polish to the cutting surface is necessary in the next stage, by means of sandpaper for example, so as to smooth and clean the cutting surface. However, the manual operation efficiency is low, and the manual polish may pollute the pencil tip, resulting in poor cutting quality.

Therefore, there is an urgent need for an efficient electric pencil sharpener with delay function that has simple structure, improved cutting effect and low cost to solve the above problems.

SUMMARY OF THE INVENTION

The purpose of the present application is to provide an efficient electric pencil sharpener with delay function that has simple structure, improved cutting effect and low cost.

Accordingly, an electric pencil sharpener with delay function includes a motor, a drive assembly, a gear assembly and a cutter assembly housed in a box body, the gear assembly has an input end connected with the motor, and an output end connected with a connection between the drive assembly and the cutter assembly. The drive assembly includes a connecting rod which is rotatable and movable back and forth; a drive shaft and a start trigger which are coaxially and retractably connected to ends of the connecting rod; a stop trigger retractably connected to an exterior of the connecting rod; and a thrust plate which is rotatable and movably disposed on a front end of the drive shaft. The stop trigger is located at a front side of the start trigger, a front end of the connecting rod and a back end of the cutter assembly are connected with the output end of the gear assembly; the connecting rod is moved backward to drive the start trigger to trigger the motor, under a thrust force action of a pencil inserting into the cutter assembly; and the connecting rod is synchronously rotated with the cutter assembly under a driving of the gear assembly; the stop trigger is provided with a teeth structure and a friction structure, the connecting rod is provided with a ring portion for matching with the friction structure, the ring portion is provided with a bulge portion for intermittently engaging with one tooth of the teeth structure, an engaging force between the teeth structure and the bulge portion is larger than a friction force between the friction structure and the ring portion; the thrust plate and the drive shaft are installed in the cutter assembly at a certain distance, the thrust plate is rotated or moved to push against the drive shaft under a push action of a pencil tip, so that the connecting rod continues to move backwards until the bulge portion engages with the teeth structure, and the ring portion matches with the friction structure, thereby actuating the stop trigger to move left and right to trigger an action of the stop switch of the motor.

In comparison with the prior arts, in the electric pencil sharpener with delay function in the present application, under the insertion action of the pencil, the connecting rod is driven by the cutter assembly to move backward, so that the start trigger is contacted with the start switch, and the motor is actuated, accordingly, the drive assembly and the cutter assembly are rotated by the driving of the gear assembly. During the cutting process, as the length of the pencil tip increases, the thrust plate moves backward or rotates to push the drive shaft, under the push force of the pencil tip; accordingly the connecting rod is pushed backward, and the bulge portion is engaged with the teeth structure of the stop trigger, meanwhile the ring portion rolls on the friction structure of the stop trigger, so that the stop trigger moves in the left and right direction to approach the stop switch under the action of the rotation of the connecting rod. Since only one bulge portion is configured, thus the bulge portion will be relatively detached from the teeth structure for every one circle rotation of the connecting rod. At this time, the connecting rod continues to rotate, but not move backward due to the actions of the teeth structure. In such a way, the bulge portion of the connecting rod and the teeth structure of the stop trigger engage with each other intermittently, and the stop trigger will only contact with the stop switch after the connecting rod rotates for several circles, so that the rotation of the motor will not Immediately stopped, instead, the rotation of the motor will be maintained for a period of time after the cutting process is completed. That is to say, the time node of the stop action for the motor is delayed and extended, to possess said delay function. During the delay process, the cutter assembly no longer moves backward to cut the pencil, instead, only trims surface of the rotating pencil tip to smooth it, thereby improving the cutting and sharpening effect. In addition, since the stop trigger is located on the relative front side of the start trigger, the start switch will be disconnected earlier than the stop switch when the pencil is pulled out, that is to say, the motor will not start during the pencil pulling, and therefore the cutting is more safe and reliable. Furthermore, the start switch and the stop switch are actuated by means of the mechanical motion of the connecting rod, which is efficient. The overall structure is simple and compact, the cutting effect is good, and the cost is low.

As a preferable embodiment, the cutter assembly includes a cutter holder, a pencil insertion channel, a hob and a cutter shaft, the pencil insertion channel is configured at a bottom side of the cutter holder, and coaxial with the connecting rod, the hob is coaxial with the cutter shaft and obliquely disposed at a top side of the cutter holder, and a rear end of the cutter holder is connected with the gear assembly to drive the hob to make planetary cutting motion around the pencil.

As a preferable embodiment, the thrust plate includes a transverse plate and a first vertical plate and a second vertical plate connected to opposite ends of the transverse plate, the first vertical plate has a longer length than the second vertical plate, the first vertical plate is configured to connect with the cutter shaft, and the second vertical plate is configured to connect with the pencil tip.

As a preferable embodiment, the thrust plate is configured in an inclined status, the first vertical plate is slidable and connected to a rear end of the cutter shaft, and the second vertical plate is slidable at a rear end of the pencil insertion channel, so that the thrust plate is rotated backward around the cutter shaft under the push action of the pencil tip to push the drive shaft.

As a preferable embodiment, the thrust plate is configured in an inclined status, the first vertical plate is rotatable and connected to a rear end of the cutter shaft, and the second vertical plate is suspended at a rear end of the pencil insertion channel, so that the thrust plate is rotated backward around the cutter shaft under the push action of the pencil tip to push the drive shaft.

As a preferable embodiment, the thrust plate is configured in an inclined status, the first vertical plate is fixedly connected to a rear end of the cutter shaft, and the second vertical plate is slidable at a rear end of the pencil insertion channel, so that the thrust plate is rotated backward around the cutter shaft under the push action of the pencil tip to push the drive shaft, and the cutter shaft is moved backward to cause a neck of the cutter shaft to slide into a groove of the cutter holder.

As a preferable embodiment, the gear assembly includes a first helical gear, a double gear and a second helical gear meshing successively from bottom to top, the first helical gear is connected to an output end of the motor, a front end of the connecting rod and a back end of the cutter holder are connected to a gear sleeve of the second helical gear; the gear assembly further includes an internal gear and a bevel gear, the internal gear is installed in a lateral end of the cutter holder, and located close to the back end of cutter shaft, the bevel gear is sleeved on the cutter shaft, one end of the bevel gear is engaged with the internal gear, and the other end of the bevel gear is connected with the hob, so that the hob rotates with the cutter holder and simultaneously moves along a circumference of the internal gear.

As a preferable embodiment, the drive assembly includes a first elastic element, a second elastic element and a third elastic element, the first elastic element is configured between the start trigger and the box body for constantly driving the start trigger to move away from the start switch, the second elastic element is configured between the cutter assembly and the gear assembly for constantly driving the cutter assembly to move away from the gear assembly, and the third elastic element is configured between the drive shaft and the cutter assembly for constantly driving the drive shaft to move in a direction releasing the push force to the connecting rod.

As a preferable embodiment, the gear assembly includes a first helical gear, a double gear and a second helical gear meshing successively from bottom to top, the first helical gear is connected to an output end of the motor, a front end of the connecting rod and a back end of the cutter holder are connected to a gear sleeve of the second helical gear.

As a preferable embodiment, the gear assembly further includes an internal gear and a bevel gear, the internal gear is installed in a lateral end of the cutter holder, and located close to the back end of cutter shaft, the bevel gear is sleeved on the cutter shaft, one end of the bevel gear is engaged with the internal gear, and the other end of the bevel gear is connected with the hob, so that the hob rotates with the cutter holder and simultaneously moves along a circumference of the internal gear.

As a preferable embodiment, the drive assembly includes a first elastic element, a second elastic element and a third elastic element, the first elastic element is configured between the start trigger and the box body for constantly driving the start trigger to move away from the start switch, the second elastic element is configured between the cutter assembly and the gear assembly for constantly driving the cutter assembly to move away from the gear assembly, and the third elastic element is configured between the drive shaft and the cutter assembly for constantly driving the drive shaft to move in a direction releasing the push force to the connecting rod.

As a preferable embodiment, it further includes a pencil feeding assembly rotatable and arranged on the box body at a front side of the cutter assembly, and the pencil feeding assembly is provided with a plurality of insertion ports which are selectively connected to the pencil insertion channel As a preferable embodiment, the box body includes a base, a support base, a box cover, a fixed base and a drawer, the support base is detachably installed at a center of base, the motor, the drive assembly and the gear assembly are installed at a rear side of the support base, the cutter assembly is configured on a front side of the support base through the fixed base, the pencil feeding assembly is rotatable and arranged on a front side of the fixed base, the box cover is detachably arranged on a back end of the base and covers the motor, the drive assembly, the support base and the fixed base, and the drawer is embedded in space defined by the base, the box cover and the fixed base.

As a preferable embodiment, the stop trigger has an inserting slot, a top sidewall and a bottom sidewall of the inserting slot are provided with the teeth structure and the friction structure respectively.

BRIEF DESCRIPTION OF THE DRAWINGS

The accompanying drawings facilitate an understanding of the various embodiments of this invention. In such drawings.

DETAILED DESCRIPTION OF ILLUSTRATED EMBODIMENTS

Figure 1:
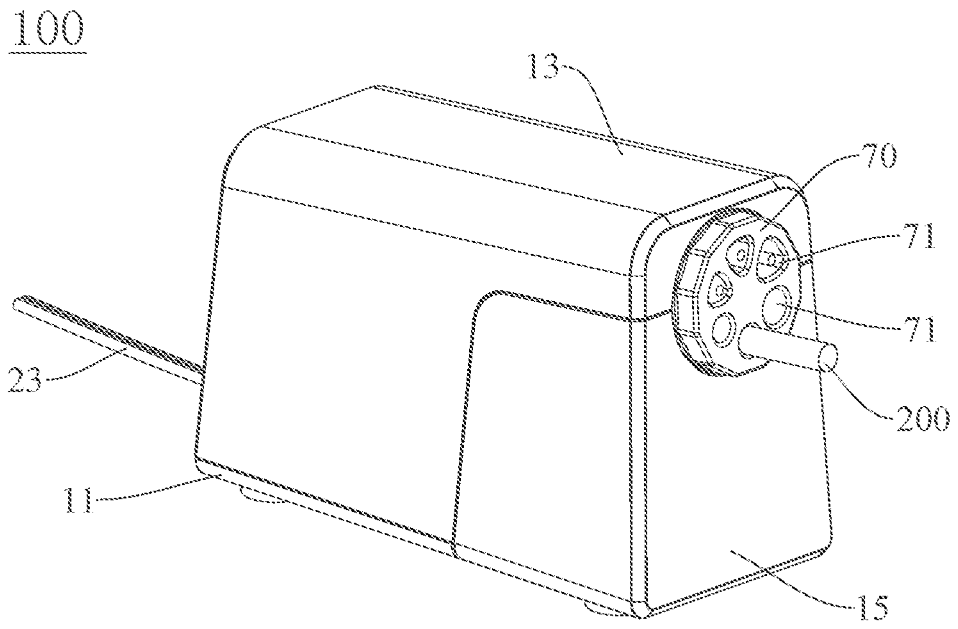
FIG. 1 is a perspective view of an electric pencil sharpener with delay function according to an embodiment of the present application.

In order to make the purpose, technical solutions and advantages of the present application more clearly understood, the present application will be described in further detail below with reference to the accompanying drawings and embodiments. It should be understood that the specific embodiments described herein are only used to explain the present application, but not to limit the present application. The same reference numbers in different figures represent the same parts.

Referring to FIGS. 1-8, an electric pencil sharpener 100 with delay function provided in the present application is used for automatically cutting a pencil 200. In this application, the pencil 200 may have a circular, a triangular or a hexagonal cross section, and may have different size for the same shape. Specifically, the electric pencil sharpener 100 include a box body 10, a motor 20, a drive assembly 30, a gear assembly 40 and a cutter assembly 50 housed in the box body 10. An input end of the gear assembly 40 is connected with an output end of the motor 20, and output end of the gear assembly 40 is connected with a connection between the drive assembly 30 and the cutter assembly 50. The drive assembly is functioned as a trigger assembly to trigger the start and stop of the motor 20. The motor is served as the power source and is configured to drive the cutter assembly 50 to rotate under the transmission of the gear assembly 40. The cutter assembly 50 is used to cut the inserted pencil 200, and trim the cutting surface of the pencil in a delay process. It should be noted that, a front or back direction mentioned in the application is taken referring to the insertion direction of pencil 200. A side of box body 10 where the pencil 200 is inserted is referred as the front side and an opposite side is referred as the rear side. The motor 20 is triggered to rotate by a start switch 21 electrically connected thereon, and is triggered to stop rotating by a stop switch 22 electrically connected thereon. Further, the motor 20 is connected to an external power supply by wires 23.

Figure 3:
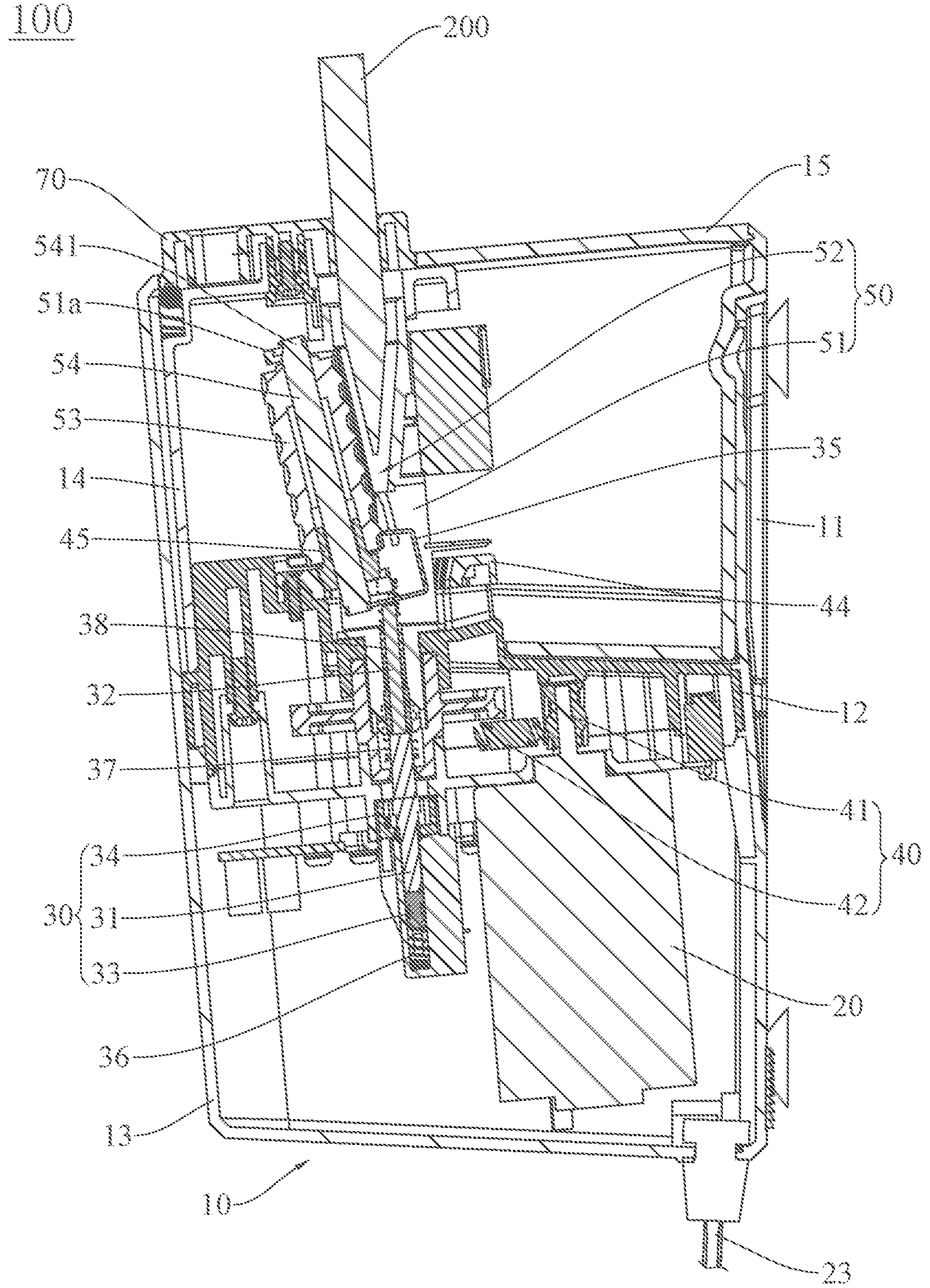
FIG. 3 is a section view along the A-A direction in FIG. 2.
Figure 7:
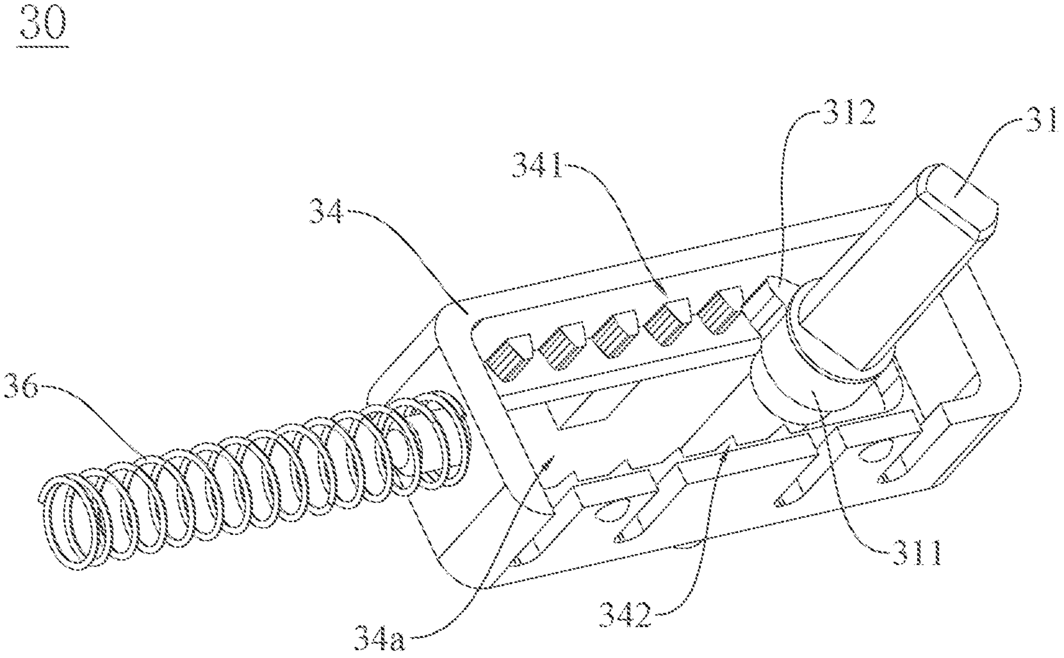
FIG. 7 is a perspective view of a drive assembly according to an embodiment of the present application.

Specifically, referring to FIG. 3, the drive assembly 30 includes a connecting rod 31 which is rotatable and movably arranged back and forth; a drive shaft 32 and a start trigger 33 which are coaxially and retractably connected to ends of the connecting rod 31; a stop trigger 34 retractably connected to an exterior of the connecting rod 31; and a thrust plate 35 which is rotatable and movably disposed on front end of the drive shaft 32. The stop trigger 34 is located at a front side of the start trigger 33, a front end of the connecting rod 31 and a back end of the cutter assembly 50 are connected with the output end of the gear assembly 40, so that the connecting rod can be moved backward to drive the start trigger 33 to trigger the motor 20, under a thrust force action of the pencil 200 inserting into the cutter assembly 50, further the connecting rod 31 can be synchronously rotated with the cutter assembly 50 under the driving of the gear assembly 40. Referring to FIG. 7, the stop trigger 34 has an inserting slot 34*a*, a top sidewall of the inserting slot 34*a* is provided with a teeth structure 341, and a bottom sidewall of the inserting slot 34*a* is provided with a friction structure 342. The connecting rod 31 is provided with a ring portion 311 for matching with the friction structure 342. The ring portion 311 is provided with a bulge portion 312 for engaging with one tooth of the teeth structure 341. The engaging force between the teeth structure 341 and the bulge portion 312 is much larger than the friction force between the friction structure 342 and the ring portion 311. The thrust plate 35 and the drive shaft 32 are installed in the cutter assembly 50 at a certain distance. The thrust plate 35 is rotated or moved to push against the drive shaft 32, under the push action of the pencil tip, so that the connecting rod 31 continues to move backwards until the bulge portion 312 engages with the teeth structure 341, and the ring portion 311 matches with the friction structure 342, thereby actuating the stop trigger 34 to move left and right to trigger the action of the stop switch 22. Specifically, the connecting rod 31 is tubular and has a certain length. Each tooth in the teeth structure 341 is parallel one another at the same spacing and has the same height. The friction structure 342 has several protrusions on the surface, and each protrusion is parallel one another at the same spacing and has a height smaller than the height of each tooth in the teeth structure 341. The shape of the protrusions may be triangular, circular, wavy or serrated.

When works, the pencil 200 is inserted into the cutter assembly 50 to push the cutter assembly 50 backward, accordingly driving the connecting rod 31 backward, and the start trigger 33 will then be moved to the start switch 21 to actuate the motor 20. The motor 20 rotates, and the gear assembly 40 rotates with it, driving the drive assembly 30 and the cutter assembly 50 to rotate, thereby sharpening the pencil 200. As the cutting progresses, the thrust plate 35 moves backward or rotates under the pushing action of the pencil tip until it contacts and pushes the drive shaft 32, so that the connecting rod 31 is pushed backward, the bulge portion 312 is engaged with the teeth structure 342 of the stop trigger 34, and the ring portion 311 rolls on the friction structure 342, and then the stop trigger 34 moves in the left and right direction to approach the stop switch 22 under the action of the rotation of the connecting rod 31. Note that, only one bulge portion 312 is configured, thus the bulge portion 312 will be relatively detached from the teeth structure 342 for every one circle rotation of the connecting rod 31. At this time, the connecting rod 31 will no longer move backward, but only rotate, and the bulge portion 312 will be engaged with the teeth structure 342 again when a second circle rotation of the connecting rod 31 arrives. The stop trigger 34 is continued to move another tooth distance. In such a way, the bulge portion 312 of the connecting rod 31 and the teeth structure 341 of the stop trigger 34 engage with each other intermittently, and the stop trigger 34 contacts with the stop switch 22 after the connecting rod 31 rotates for several circles, so that the rotation of the motor 20 will not immediately stopped, instead, such a rotation will be maintained for a period of time after the cutting process is completed. That is to say, the time node of the stop action for the motor 20 is delayed and extended, to possess said delay function. During this delay, the cutter assembly 50 stops sharpening and cutting, but only trims the cutting surface of the pencil tip to remove shavings on the cutting surface. Until the stop trigger 34 moves to contact with the stop switch 22 of the motor 20, the motor 20 stops running, thereby achieving the purpose of delay stop.

Figure 4:
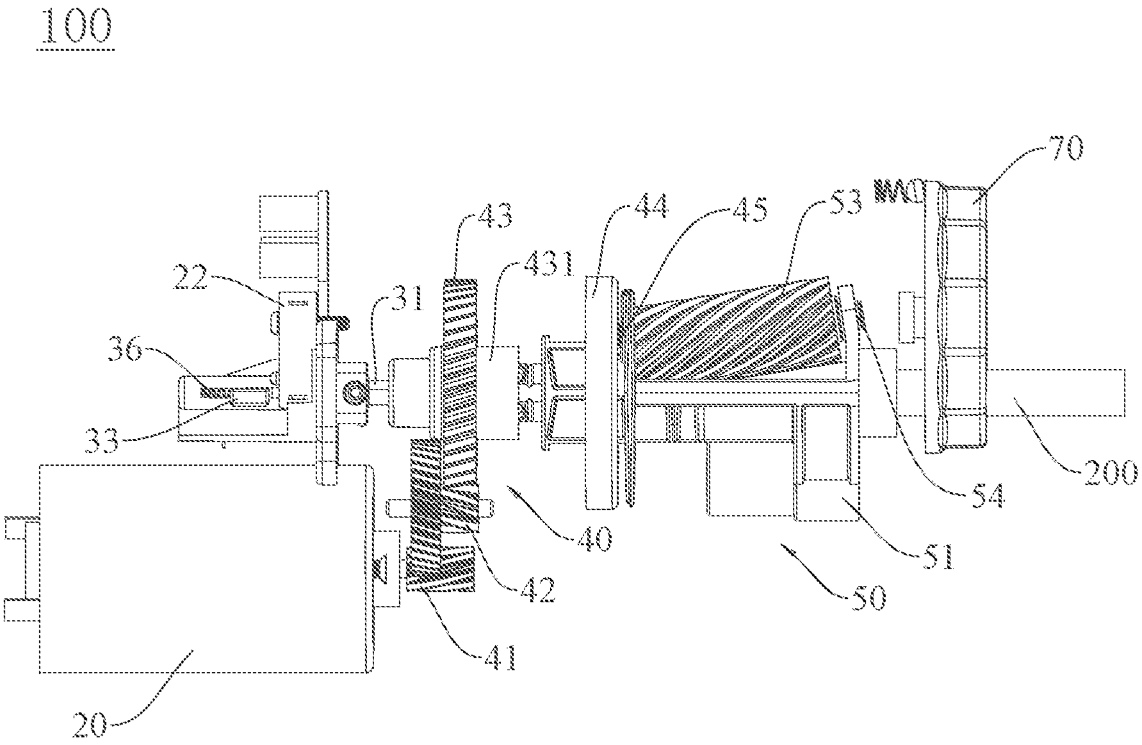
FIG. 4 is a side view of an electric pencil sharpener with delay function according to an embodiment of the present application, with the box body hidden.
Figure 5:
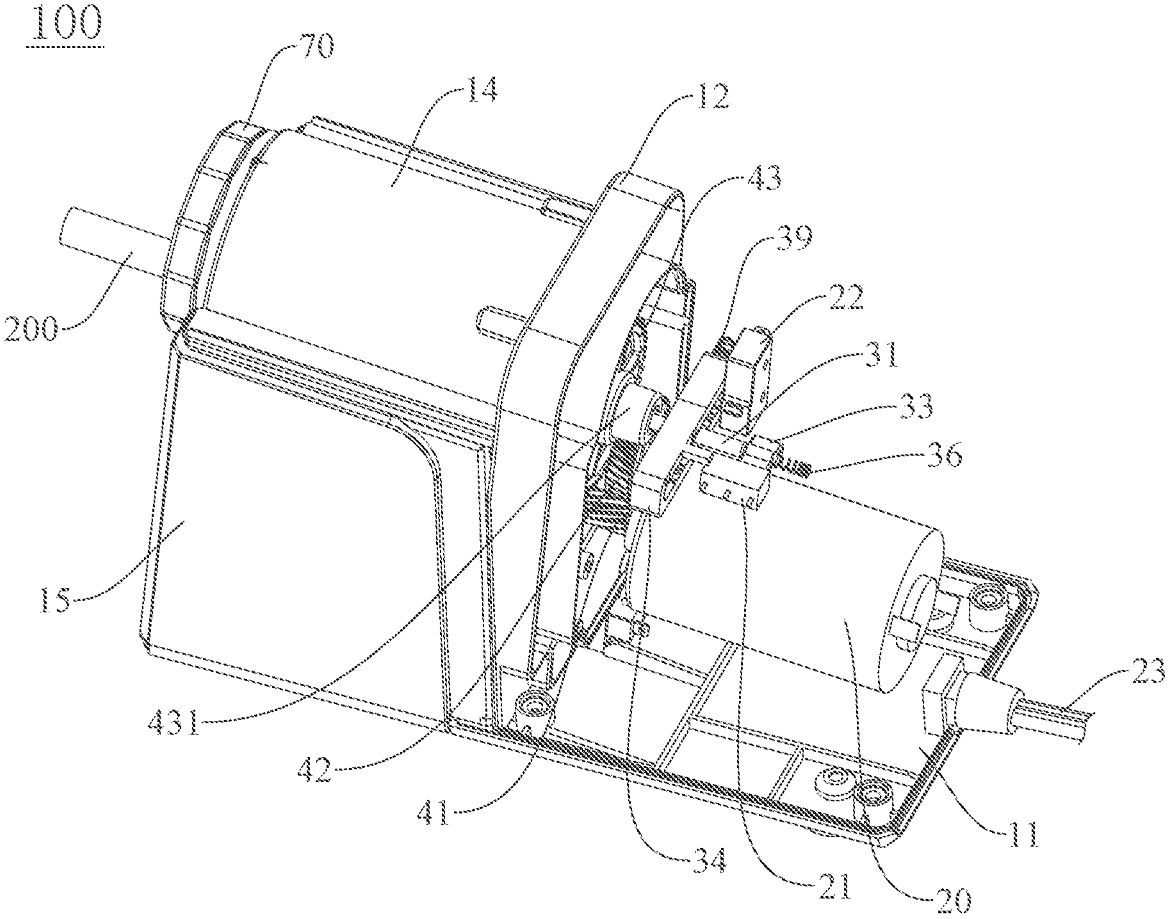
FIG. 5 is a perspective view of an electric pencil sharpener with delay function according to an embodiment of the present application, with the box cover hidden.
Figure 6:
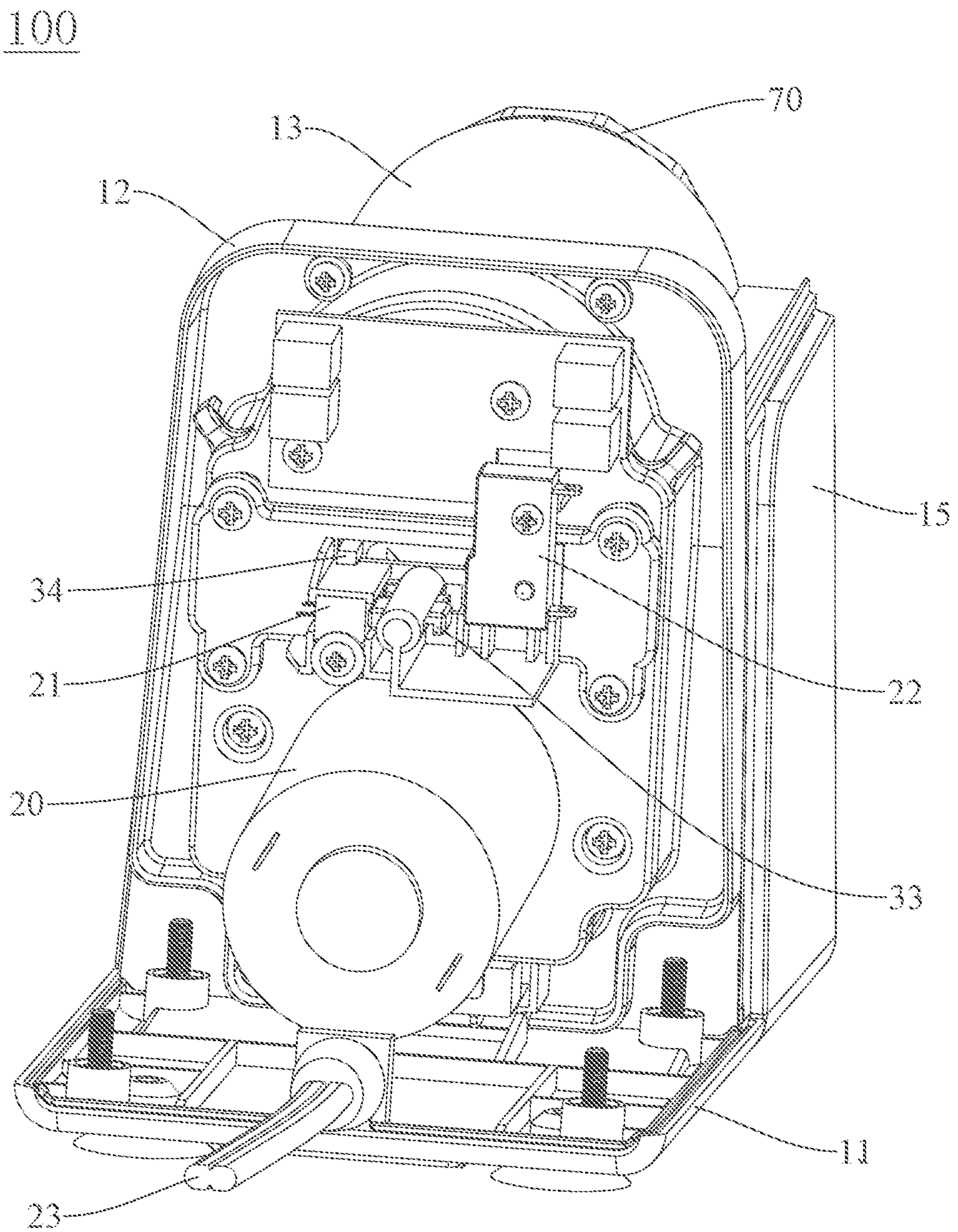
FIG. 6 is another perspective view of an electric pencil sharpener with delay function according to an embodiment of the present application, with the box cover hidden.

Referring to FIGS. 3-5, in order to simply and efficiently realize the retractable movement of the start trigger 33, the cutter assembly 50 and the drive shaft 32, and realize a quick reset, the drive assembly 30 includes a first elastic element 36, a second elastic element 37 and a third elastic element 38. The first elastic element 36 is arranged between the start trigger 33 and the box body 10, for constantly driving the start trigger 33 to move away from the start switch 21. The second elastic element 37 is arranged between the cutter assembly 50 and the gear assembly 40, for constantly driving the cutter assembly 50 to move away from the gear assembly 40. The third elastic element 38 is arranged between the drive shaft 32 and the cutter assembly 50, for constantly driving the drive shaft 32 to move in the direction releasing the push force to the connecting rod 31, so that the stop trigger 34 moves in the direction away from the start switch 21 to reset. In addition, a fourth elastic element 39 is arranged between the inner wall of the stop trigger 34 and the box body 10, which is used to constantly drive the stop trigger 34 to move in the direction away from the stop switch 22. Specifically, the first, second, third and fourth elastic elements 36, 37, 38 and 39 may be springs. When the motor 20 stops, the pencil 200 is pulled out, and the drive assembly 30 and the cutter assembly 50 are reset to their initial positions under the action of the restoring force of the respective spring.

Referring to FIGS. 3-5, the cutter assembly 50 includes a cutter holder 51, a pencil insertion channel 52, a hob 53 and a cutter shaft 54. The pencil insertion channel 52 is configured on a bottom side of the cutter holder 51, and is arranged coaxially with the connecting rod 31. Further, the pencil insertion channel 52 has a certain taper for better receiving the pencil 200. The hob 53 is coaxial with the cutter shaft 54 and obliquely disposed at a top side of the cutter holder 51, and a rear end of the cutter holder 51 is connected with the gear assembly 40 to drive the hob 53 to make planetary cutting motion around the pencil 200.

Referring to FIGS. 3-5, the gear assembly 40 includes a first helical gear 41, a double gear 42 and a second helical gear 43 meshing successively from bottom to top. The first helical gear 41 is connected to the output end of the motor 20. The front end of the connecting rod 31 and the back end of the cutter holder 51 are connected to a gear sleeve 431 of the second helical gear 43. The connecting rod 31 and the cutter holder 51 are effectively fixed through the gear sleeve 431 located at the center hole of the second helical gear 43, so that the connecting rod 31 and the cutter holder 51 can rotate synchronously with the rotation of the second helical gear 43, with stable connection. Specifically, the second elastic element 37 is arranged between the back end of cutter holder 51 and the gear sleeve 431. Specifically, the gear assembly 40 further includes an internal gear 44 and a bevel gear 45. The internal gear 44 is installed in the lateral end of the cutter holder 51, and located close to the backend of cutter shaft 54. The bevel gear 45 is sleeved on the cutter shaft 54, one end of the bevel gear 45 is engaged with the internal gear 44, and the other end of the bevel gear 45 is connected with the hob 53, so as to make the hob 53 to rotate with the cutter holder 51 and simultaneously move along a circumference of the internal gear 44, thereby sharpening to the pencil 200.

Figure 8:
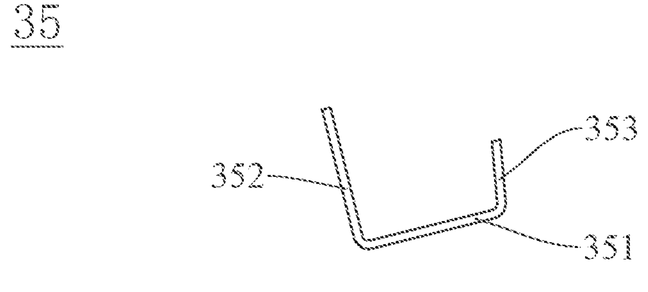
FIG. 8 plan view of a thrust plate according to an embodiment of the present application.

Referring to FIGS. 3 and 8, the thrust plate 35 includes a transverse plate 351 and a first vertical plate 352 and a second vertical plate 353 connected to each end of the transverse plate 351. The length of the first vertical plate 352 is greater than that of the second vertical plate 353. The first vertical plate 352 is configured to connect with the cutter shaft 54, and the second vertical plate 353 is configured to connect with the pencil tip. Specifically, the thrust plate 35 is configured in an inclined status.

In some embodiments, the first vertical plate 352 is rotatable and connected to the rear end of the cutter shaft 54, and the second vertical plate 353 is suspended at the rear end of the pencil insertion channel 52, so that the thrust plate 35 may be rotated backward around the cutter shaft 54 under the push action of the pencil tip, to push the drive shaft 32.

In some embodiments, the first vertical plate 352 is slidable and connected to the rear end of the cutter shaft 54, and the second vertical plate 353 is slidable at the rear end of the pencil insertion channel 52, so that the thrust plate 35 may be moved backward relative to the cutter shaft 54 under the push action of the pencil tip, to push the drive shaft 32.

In some embodiments, the first vertical plate 352 is fixedly connected to the rear end of the cutter shaft 54, and the second vertical plate 352 is slidable at the rear end of the pencil insertion channel 52, so that the thrust plate 35 may be moved backward relative to the cutter shaft 54 under the push action of the pencil tip, to push the drive shaft 32. It should be noted that, the backward movement of the thrust plate 35 will drive the cutter shaft 54 to move backward, and the narrowed neck 541 of the cutter shaft 54 at the front end will slide into a groove **51*a* of the cutter holder 51 at the top side, so that the placement angle of the cutter shaft 54 relative to the pencil insertion channel 52 can be changed, accordingly the hob 53 is deviated from the pencil. At this time, the hob 53** will not cut the pencil tip, instead, just trim the cutting surface to further improve the cutting effect.

Figure 2:
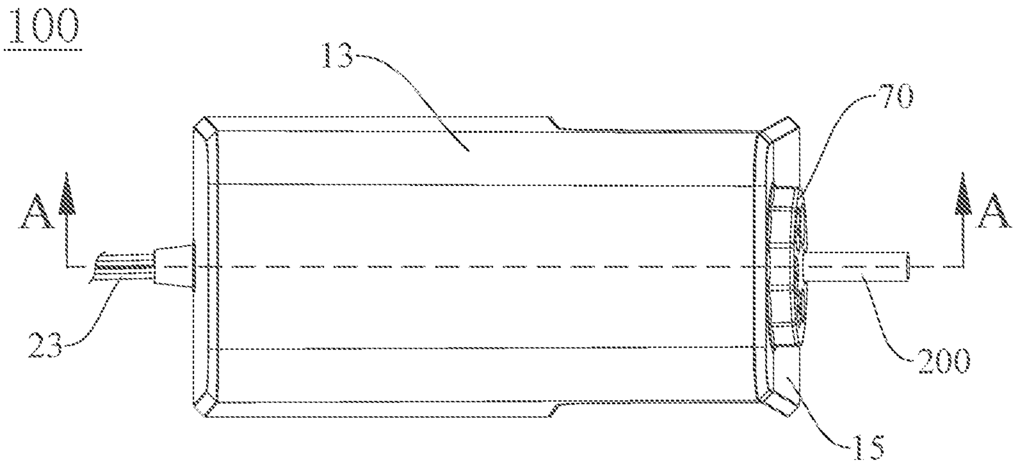
FIG. 2 is a plan view of an electric pencil sharpener with delay function according to an embodiment of the present application.

Referring to FIGS. 1-3, in order to realize the effective insertion of pencil 200, the electric pencil sharpener 100 with delay function of the present application further includes a pencil feeding assembly 70, which is rotatable and arranged on the box body 10 at the front side of the cutter assembly 50. The pencil feeding assembly 70 is provided with a plurality of insertion ports 71 with different shapes. The insertion ports 71 are selectively connected to the pencil insertion channel 52, so as to realize the cutting operation of pencil 200 with different shapes, and effectively improve the adaptability of the electric pencil sharpener 100 of the present application. Optionally, the same shape for the insertion ports 71 may have different sizes. In use, the pencil feeding assembly 70 is turned to choose an appropriate insertion port 71 for the pencil 200 to connect with the pencil insertion channel 52.

Referring to FIGS. 1-6, the box body 10 includes a base 11, a support base 12, a box cover 13, a fixed base 14 and a drawer 15. The support base 12 is detachably installed at the relative center of base 11. The motor 20, the drive assembly 30 and the gear assembly 40 are installed at the rear side of the support base 12. The cutter assembly 50 is configured on the front side of the support base 12 through the fixed base 14. The pencil feeding assembly 70 is rotatable and arranged on the front side of the fixed base 14. The box cover 13 is detachably arranged on the back end of the base 11 and covers the motor 20, the drive assembly 30, the support base 12 and the fixed base 14. The drawer 15 may be embedded in the space defined by the base 11, the box cover 13 and the fixed base 14. Specifically, the components of the box body 10 consisting of the base 11, the support seat 12, the box cover 13, the fixed base 14 and the drawer 15, are all detachable, which facilitates the assembly and maintenance. The pencil feeding assembly 70 is exposed to the outside of the box body 10, which facilitates the insertion and removal of the pencil 200. Specifically, the motor 20, the drive assembly 30 and the gear assembly 40 are arranged in the box body 10 in an inclined manner.

Comparing with the prior arts, in the electric pencil sharpener with delay function in the present application, under the insertion action of the pencil 200, the connecting rod 31 is driven by the cutter assembly 50 to move backward, so that the start trigger is contacted with the start switch 21, and the motor 20 is actuated, accordingly, the drive assembly 30 and the cutter assembly 50 are rotated by the driving of the gear assembly 40. During the cutting process, as the length of the pencil tip increases, the thrust plate 35 moves backward or rotates to push the drive shaft 32, under the push force of the pencil tip; accordingly the connecting rod 31 is pushed backward, and the bulge portion 312 is engaged with the teeth structure 342 of the stop trigger 34, meanwhile the ring portion 311 rolls on the friction structure 342 of the stop trigger 34, so that the stop trigger 34 moves in the left and right direction to approach the stop switch 22 under the action of the rotation of the connecting rod 31. Since only one bulge portion 312 is configured, thus the bulge portion 312 will be relatively detached from the teeth structure 342 for every one circle rotation of the connecting rod 31. At this time, the connecting rod 31 continues to rotate, but not move backward due to the actions of the teeth structure 342. In such a way, the bulge portion 312 of the connecting rod 31 and the teeth structure 341 of the stop trigger 34 engage with each other intermittently, and the stop trigger 34 will only contact with the stop switch 22 after the connecting rod 31 rotates for several circles, so that the rotation of the motor 20 will not immediately stopped, instead, the rotation of the motor 20 will be maintained for a period of time after the cutting process was completed. That is to say, the time node of the stop action for the motor 20 is delayed and extended, to possess said delay function. During the delay process, the cutter assembly 50 no longer moves backward to cut the pencil, instead, only trims the rotating pencil tip to smooth it, thereby improving the cutting and sharpening effect. In addition, since the stop trigger 34 is located on the relative front side of the start trigger 33, the start switch 21 will be disconnected earlier than the stop switch 22 when the pencil 200 is pulled out, that is to say, the motor 20 will not start during the pencil pulling, thus the cutting is more safe and reliable. Furthermore, the start switch 21 and the stop switch 22 are actuated by means of the mechanical motion of the connecting rod 31, which is efficient. The overall structure is simple and compact, the cutting effect is good, and the cost is low.

The above-mentioned embodiments only represent several embodiments of the present application, and the descriptions thereof are relatively specific and detailed, but should not be construed as limiting the scope of the patent application. It should be pointed out that for those skilled in the art, several modifications and improvements can be made without departing from the concept of the present application, which all belong to the protection scope of the present application. Therefore, the scope of protection of the patent of the present application shall be subject to the appended claims.

What is claimed is:

1. An electric pencil sharpener with delay function, comprising a motor, a drive assembly, a gear assembly and a cutter assembly housed in a box body, the gear assembly having an input end connected with the motor, and an output end connected with a connection between the drive assembly and the cutter assembly;

wherein the drive assembly comprises:

a connecting rod which is rotatable and movable back and forth;

a drive shaft and a start trigger which are coaxially and retractably connected to ends of the connecting rod;

a stop trigger retractably connected to an exterior of the connecting rod; and a thrust plate which is rotatable and movably disposed on a front end of the drive shaft;

the stop trigger is located at a front side of the start trigger, a front end of the connecting rod and a back end of the cutter assembly are connected with the output end of the gear assembly;

the connecting rod is moved backward to drive the start trigger to trigger the motor, under a thrust force action of a pencil inserting into the cutter assembly; and the connecting rod is synchronously rotated with the cutter assembly under a driving of the gear assembly;

the stop trigger is provided with a teeth structure and a friction structure, the connecting rod is provided with a ring portion for matching with the friction structure, the ring portion is provided with a bulge portion for intermittently engaging with one tooth of the teeth structure, an engaging force between the teeth structure and the bulge portion is larger than a friction force between the friction structure and the ring portion;

the thrust plate and the drive shaft are installed in the cutter assembly at a certain distance, the thrust plate is rotated or moved to push against the drive shaft under a push action of a pencil tip, so that the connecting rod continues to move backwards until the bulge portion engages with the teeth structure, and the ring portion matches with the friction structure, thereby actuating the stop trigger to move left and right to trigger an action of a stop switch of the motor;

wherein the cutter assembly comprises a cutter holder, a pencil insertion channel, a hob and a cutter shaft, the pencil insertion channel is configured at a bottom side of the cutter holder, and coaxial with the connecting rod, the hob is coaxial with the cutter shaft and obliquely disposed at a top side of the cutter holder, and a rear end of the cutter holder is connected with the gear assembly to drive the hob to make planetary cutting motion around the pencil;

wherein the drive assembly comprises a first elastic element, a second elastic element and a third elastic element, the first elastic element is configured between the start trigger and the box body for constantly driving the start trigger to move away from a start switch, the second elastic element is configured between the cutter assembly and the gear assembly for constantly driving the cutter assembly to move away from the gear assembly, and the third elastic element is configured between the drive shaft and the cutter assembly for constantly driving the drive shaft to move in a direction releasing the push force to the connecting rod.

2. The electric pencil sharpener with delay function according to claim 1, wherein the thrust plate comprises a transverse plate and a first vertical plate and a second vertical plate connected to opposite ends of the transverse plate, the first vertical plate has a longer length than the second vertical plate, the first vertical plate is configured to connect with the cutter shaft, and the second vertical plate is configured to connect with the pencil tip.

3. The electric pencil sharpener with delay function according to claim 2, wherein the thrust plate is configured in an inclined status, the first vertical plate is slidable and connected to a rear end of the cutter shaft, and the second vertical plate is slidable at a rear end of the pencil insertion channel, so that the thrust plate is rotated backward around the cutter shaft under the push action of the pencil tip to push the drive shaft.

4. The electric pencil sharpener with delay function according to claim 2, wherein the thrust plate is configured in an inclined status, the first vertical plate is rotatable and connected to a rear end of the cutter shaft, and the second vertical plate is suspended at a rear end of the pencil insertion channel, so that the thrust plate is rotated backward around the cutter shaft under the push action of the pencil tip to push the drive shaft.

5. The electric pencil sharpener with delay function according to claim 2, wherein the thrust plate is configured in an inclined status, the first vertical plate is fixedly connected to a rear end of the cutter shaft, and the second vertical plate is slidable at a rear end of the pencil insertion channel, so that the thrust plate is rotated backward around the cutter shaft under the push action of the pencil tip to push the drive shaft, and the cutter shaft is moved backward to cause a neck of the cutter shaft to slide into a groove of the cutter holder.

6. The electric pencil sharpener with delay function according to claim 1, wherein the gear assembly comprises a first helical gear, a double gear and a second helical gear meshing successively from bottom to top, the first helical gear is connected to an output end of the motor, a front end of the connecting rod and a back end of the cutter holder are connected to a gear sleeve of the second helical gear.

7. The electric pencil sharpener with delay function according to claim 6, wherein the gear assembly further comprises an internal gear and a bevel gear, the internal gear is installed in a lateral end of the cutter holder, and located close to the back end of cutter shaft, the bevel gear is sleeved on the cutter shaft, one end of the bevel gear is engaged with the internal gear, and the other end of the bevel gear is connected with the hob, so that the hob rotates with the cutter holder and simultaneously moves along a circumference of the internal gear.

8. The electric pencil sharpener with delay function according to claim 1, further comprising a pencil feeding assembly rotatable and arranged on the box body at a front side of the cutter assembly, and the pencil feeding assembly is provided with a plurality of insertion ports which are selectively connected to the pencil insertion channel.

9. The electric pencil sharpener with delay function according to claim 8, wherein the box body comprises a base, a support base, a box cover, a fixed base and a drawer, the support base is detachably installed at a center of base, the motor, the drive assembly and the gear assembly are installed at a rear side of the support base, the cutter assembly is configured on a front side of the support base through the fixed base, the pencil feeding assembly is rotatable and arranged on a front side of the fixed base, the box cover is detachably arranged on a back end of the base and covers the motor, the drive assembly, the support base and the fixed base, and the drawer is embedded in space defined by the base, the box cover and the fixed base.

10. The electric pencil sharpener with delay function according to claim 1, wherein the stop trigger has an inserting slot, a top sidewall and a bottom sidewall of the inserting slot are provided with said teeth structure and said friction structure respectively.

* * * * *